US012095970B2

United States Patent
Tanaka

(10) Patent No.: US 12,095,970 B2
(45) Date of Patent: Sep. 17, 2024

(54) IMAGE CAPTURING APPARATUS AND METHOD OF CONTROLLING THE SAME

(71) Applicant: CANON KABUSHIKI KAISHA, Tokyo (JP)

(72) Inventor: Tomonori Tanaka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/949,336

(22) Filed: Sep. 21, 2022

(65) Prior Publication Data

US 2023/0098499 A1    Mar. 30, 2023

(30) Foreign Application Priority Data

Sep. 29, 2021  (JP) ................. 2021-159723

(51) Int. Cl.
*H04N 13/243* (2018.01)
*H04N 13/296* (2018.01)

(52) U.S. Cl.
CPC ......... *H04N 13/243* (2018.05); *H04N 13/296* (2018.05)

(58) Field of Classification Search
CPC .. H04N 13/243; H04N 13/296; H04N 23/695; H04N 23/90; H04N 23/60
See application file for complete search history.

(56) References Cited

U.S. PATENT DOCUMENTS

| 2005/0046701 | A1* | 3/2005 | Kaneko | H04N 5/2621 348/222.1 |
| 2015/0071308 | A1* | 3/2015 | Webb, III | H04W 56/0035 370/503 |
| 2018/0160042 | A1* | 6/2018 | He | H04N 13/156 |
| 2019/0208130 | A1* | 7/2019 | Hara | G06F 1/189 |

FOREIGN PATENT DOCUMENTS

| JP | H08279924 A | * 10/1996 |
| JP | 2016-142785 A | 8/2016 |
| JP | 2020072300 A | * 5/2020 |

* cited by examiner

*Primary Examiner* — Michael Lee
(74) *Attorney, Agent, or Firm* — Carter, DeLuca & Farrell LLP

(57) ABSTRACT

An image capturing apparatus comprising a processor executing instructions. The instructions cause the image capturing apparatus to: obtain a driving frequency in which the image capturing apparatus is capable of operating; and obtain a frequency of a synchronization signal inputted from an external device, the synchronization signal being used for outputting a video obtained by the image capturing apparatus. The instructions further cause the image capturing apparatus to: determine whether the driving frequency and the frequency of the inputted synchronization signal satisfy a predetermined relationship; and output, in a case where it is determined that the predetermined relationship is not satisfied, information of a warning message indicating that the inputted synchronization signal is incorrect.

14 Claims, 7 Drawing Sheets

- INCORRECT SYNCHRONIZATION SIGNAL HAS BEEN INPUTTED
- PLEASE INPUT CORRECT SYNCHRONIZATION SIGNAL (59.94 Hz)

IMAGE CAPTURING APPARATUS AND METHOD OF CONTROLLING THE SAME

BACKGROUND OF THE INVENTION

Field of the Invention

The present invention relates to a technique for controlling video output in an image capturing apparatus.

Description of the Related Art

A Genlock function is known as a function for enabling output in which videos outputted from cameras are switched without image disturbance when switching between images captured by a plurality of cameras using a switcher or the like. Japanese Patent Laid-Open No. 2016-142785 discloses a technique for outputting a black image when a driving frequency of an image capturing apparatus and a frequency of a synchronization signal inputted from an external unit are not compatible after enabling the Genlock function.

However, in the aforementioned conventional technique, there is a problem that simply displaying a black image when a synchronization signal is inputted at a frequency that is not compatible with a driving frequency of an image capturing apparatus does not enable a user to ascertain the cause of that black image being displayed. That is, the user cannot recognize that the synchronization signal has been inputted at an incompatible frequency. Further, there is a problem that an operation of an image capturing apparatus becomes unstable when a synchronization signal of an incompatible frequency is inputted while Genlock function is enabled.

SUMMARY OF THE INVENTION

According to one aspect of the present invention, an image capturing apparatus comprises a processor executing instructions which, when executed by the processor, cause the image capturing apparatus to: obtain a driving frequency in which the image capturing apparatus is capable of operating; obtain a frequency of a synchronization signal inputted from an external device, the synchronization signal being used for outputting a video obtained by the image capturing apparatus; determine whether the driving frequency and the frequency of the inputted synchronization signal satisfy a predetermined relationship; and output, in a case where it is determined that the predetermined relationship is not satisfied, information of a warning message indicating that the inputted synchronization signal is incorrect.

The present invention notifies a user of input of an incorrect synchronization signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Further, in the accompanying drawings, identical or similar components are denoted by identical reference signs, and redundant description will be omitted.

First Embodiment

A description will be given below using cameras in an image capturing system (an information processing apparatus having image capturing units) as an example of a first embodiment of an information processing apparatus according to the present invention.

<System Configuration and Apparatus Configuration>

Figure 1:
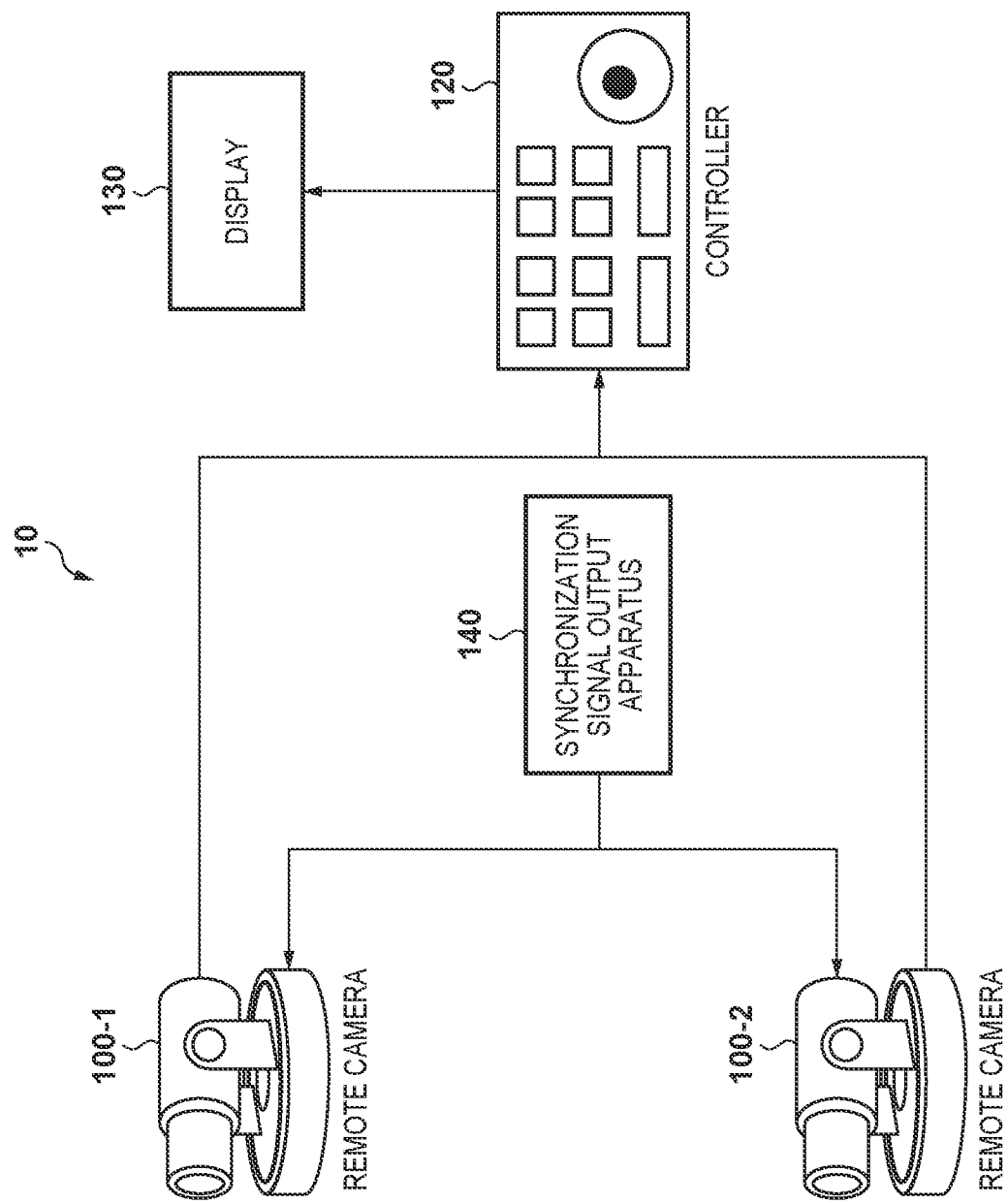
FIG. 1 is a diagram illustrating an overall configuration of an image capturing system.

FIG. 1 is a diagram illustrating an overall configuration of the image capturing system. An image capturing system 10 is configured by two cameras 100 (a camera 100-1 and a camera 100-2), a controller 120, a display 130, and a synchronization signal output apparatus 140. Here, it is assumed that video outputs from the two cameras are switched by the controller 120 and displayed on the display 130.

A synchronization signal outputted from the synchronization signal output apparatus 140 is inputted to the camera 100-1 and the camera 100-2. The video outputs from the camera 100-1 and the camera 100-2 are synchronized in accordance with the inputted synchronization signal. Therefore, even when the controller 120 switches video outputs from that of the camera 100-2 to that of the camera 100-1, a video is not interrupted. Although a case of switching between video outputs from two cameras will be described, the same applies to a case of switching among video outputs from three or more cameras.

Figure 2A:
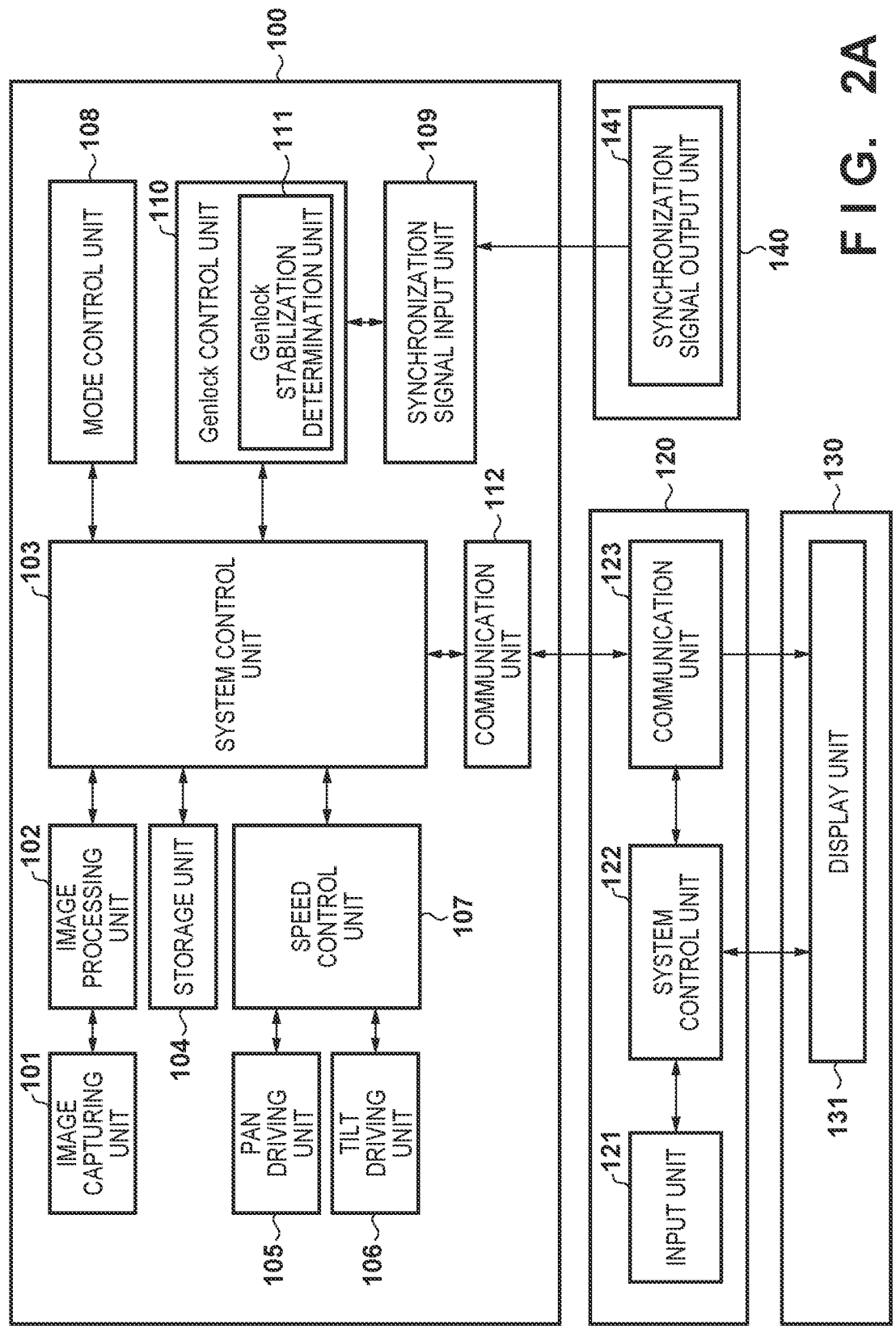
FIG. 2A is a diagram illustrating a functional configuration of respective apparatuses in the image capturing system.

FIG. 2A is a diagram illustrating a functional configuration of respective apparatuses in the image capturing system. As illustrated in FIG. 1, the image capturing system includes the camera 100, the controller 120, the display 130, and the synchronization signal output apparatus 140.

The camera 100 is also called a remote camera or network camera and captures an image of a subject in a monitoring target zone based on an instruction from a remote location. The camera 100 includes an image capturing unit 101, an image processing unit 102, a system control unit 103, and a storage unit 104. The camera 100 also includes a pan driving unit 105, a tilt driving unit 106, a speed control unit 107, a mode control unit 108, a synchronization signal input unit 109, a Genlock control unit 110, a stabilization determination unit 111, and a communication unit 112.

The image capturing unit 101 is configured by an optical system, such as a lens, and an image capturing element, such as a CMOS image sensor. The image capturing unit 101 generates an analog image signal based on a subject image formed on the image capturing element by the optical system. The analog image signal is converted into a digital image signal and outputted to the image processing unit 102.

The image processing unit 102 generates image data (or video data including a plurality of frame images) by performing predetermined image processing and compression encoding processing on the digital image signal outputted from the image capturing unit 101 and outputs it to the system control unit 103. The predetermined image processing includes, for example, development processing such as de-Bayer (demosaic) processing, white balance processing, and tone conversion processing.

The system control unit 103 controls an overall operation of the camera 100. More specifically, the system control unit 103 outputs image data, captured by the image capturing unit 101 and obtained via the image processing unit 102, to the controller 120 via the communication unit 112. The system control unit 103 also receives a control command from the controller 120 via the communication unit 112, analyzes the received command, and performs processing according to the command. For example, when a control command for setting image quality adjustment for the image processing unit 102 is received, the system control unit 103 analyzes the control command and executes image quality adjustment. Further, when a control command for performing a pan/tilt operation for the pan driving unit 105 and/or the tilt driving unit 106 is received, the system control unit 103 analyzes the control command and performs control for driving the pan driving unit 105 and/or the tilt driving unit 106. Further, when a control command for instructing Genlock enabling/disabling is received, the system control unit 103 issues an enabling or disabling instruction to the Genlock control unit 110.

The storage unit 104 stores data for control in the camera 100 and captured image data (video data). When the camera 100 operates in a playback mode, video output to a display unit 131 is performed for image data stored in the storage unit 104. Further, the storage unit 104 may store image quality adjustment parameters, network setting values, or information of an image capturing direction of the camera 100. The information of the image capturing direction may be stored as, for example, a pan angle and a tilt angle in the pan driving unit 105 and the tilt driving unit 106. Even when the camera 100 is restarted, the system control unit 103 can obtain previously set values by referencing the storage unit 104.

The pan driving unit 105, the tilt driving unit 106, and the speed control unit 107 are a direction control mechanism for controlling an image capturing direction of the camera 100. The pan driving unit 105 is configured by a mechanical driving system for performing a pan operation in accordance with a control command from the system control unit 103 and a motor, which is a driving source of the mechanical driving system. A pan driving mechanism is driven in a pan direction by the system control unit 103 performing control for driving the motor. The tilt driving unit 106 is configured by a mechanical driving system for performing a tilt operation in accordance with a control command from the system control unit 103 and a motor, which is a driving source of the mechanical driving system. A tilt driving mechanism is driven in a tilt direction by the system control unit 103 performing control for driving the motor. The speed control unit 107 calculates driving speeds to be instructed next according to a control command from the system control unit 103 and instructs the pan driving unit 105 and the tilt driving unit 106 to be driven at the respective calculated speeds. For example, a driving speed to be instructed next is calculated based on a current speed, a target speed, an acceleration value or information of an acceleration/deceleration table.

The mode control unit 108 performs control for switching operation modes of the camera 100. In FIG. 2, the mode control unit 108 is described as a functional unit that is separate from the system control unit 103; however, it may be configured as part of the system control unit 103. Here, it is assumed that there are three modes (a normal image capturing mode, a standby mode, and a playback mode) as the operation modes of the camera 100. The normal image capturing mode (a first operation mode) is a mode for outputting a video captured by the image capturing unit 101. The standby mode (a second operation mode) is a mode for stopping video output and standing by. The playback mode (a third operation mode) is a mode for outputting a video stored in the storage unit 104.

The mode control unit 108 determines whether an instruction for switching (an instruction for transitioning) to any of the operation modes has been inputted from the controller 120 via the communication unit 112 and the system control unit 103 and sets the camera 100 to operate in a determined operation mode. The mode control unit 108 may, for example, indicate an operation mode by a predetermined setting value. For example, "0" may indicate the standby mode, "1" may indicate the normal image capturing mode, and "2" may indicate the playback mode. In this case, the system control unit 103 determines an operation mode with reference to a setting value indicated by the mode control unit 108. The mode control unit 108 also performs control for switching driving frequencies at which the camera 100 operates. For example, the mode control unit 108 performs control for switching driving frequencies of 59.94 Hz and 29.97 Hz. The mode control unit 108 may, for example, indicate a current driving frequency by a predetermined setting value. For example, "10" may indicate 59.94 Hz and "11" may indicate 29.97 Hz.

When the system control unit 103 determines that it operates in the normal image capturing mode, the system control unit 103 controls each of the image capturing unit 101, the image processing unit 102, the system control unit 103, and the communication unit 112 to output a captured video (image data) to the controller 120, Further, the system control unit 103 performs pan/tilt driving control by the pan driving unit 105, the tilt driving unit 106, and the speed control unit 107. Further, the image data generated by the image processing unit 102 is stored in the storage unit 104 via the system control unit 103.

Meanwhile, when the system control unit 103 determines that it operates in the standby mode, the system control unit 103 controls so as to stop output of the captured video (image data) to the controller 120. Further, the system control unit 103 stops pan/tilt driving control by the pan driving unit 105, the tilt driving unit 106, and the speed control unit 107. A configuration may be taken so as stop pan/tilt driving control after driving to a predetermined pan/tilt position.

Further, when the system control unit 103 determines that it operates in the playback mode, the system control unit 103 controls each of the system control unit 103, the storage unit 104, and the communication unit 112 to output image data stored in the storage unit 104 to the controller 120. When a plurality of video data is stored in the storage unit 104, video data designated by a user via the controller 120 is outputted.

Further, the system control unit 103 compares a frequency of a synchronization signal (a second synchronization signal) inputted to the synchronization signal input unit 109 and a frequency of a synchronization signal (a first synchronization signal) generated by the Genlock control unit 110 to determine whether an incorrect synchronization signal has been inputted. That is, the first synchronization signal is a synchronization signal generated inside the camera. For example, it is determined whether a frequency of a synchronization signal inputted from the synchronization signal input unit 109 and a driving frequency of the image capturing unit 101, which operates according to a synchronization signal specified by the mode control unit 108 and generated by the Genlock control unit 110, coincide. As the frequency of the synchronization signal generated by the Genlock control unit 110, information of a frame rate of the image capturing unit 101 may be used in the normal image capturing mode, and information of a frame rate for outputting a video stored in the storage unit 104 may be used in the playback mode. When the frequencies coincide, it is determined that a correct synchronization signal has been inputted. Meanwhile, when the frequencies do not coincide, it is determined that an incorrect synchronization signal has been inputted. Further, if it is determined that an incorrect synchronization signal has been inputted, image data indicating that an incorrect synchronization signal has been inputted, stored in the storage unit 104, is outputted to the controller 120 via each of the system control unit 103 and the communication unit 112. Further, at that time, image data prompting input of a synchronization signal of a correct frequency is outputted to the controller 120.

The synchronization signal input unit 109 inputs a synchronization signal outputted from the synchronization signal output apparatus 140 to the camera 100. The Genlock control unit 110 performs synchronization control for the entire system control unit 103 and camera 100 by synchronizing the first synchronization signal generated by the Genlock control unit 110 with the second synchronization signal inputted from the synchronization signal input unit 109. This makes it possible to, in the normal image capturing mode, perform video output to the controller 120 in synchronization with the second synchronization signal.

Further, the Genlock control unit 110 performs control for switching Genlock enabling/disabling. Genlock enabling means, in a state where the second synchronization signal has been inputted from the synchronization signal input unit 109, starting synchronization with the first synchronization signal generated by the Genlock control unit 110, triggered by an instruction for enabling Genlock from the controller 120. Meanwhile, Genlock disabling means stopping synchronization of the first synchronization signal generated by the Genlock control unit 110 and the second synchronization signal, triggered by an instruction for disabling Genlock from the controller 120. If Genlock is disabled, the camera 100 performs operation control only with the first synchronization signal generated by the Genlock control unit 110. Since techniques for Genlock are well known, a detailed description thereof will be omitted. Further, the Genlock control unit 110 obtains a frequency of the second synchronization signal (e.g., a frequency of a V synchronization signal) inputted from the synchronization signal input unit 109.

The stabilization determination unit 111 determines whether the second synchronization signal and the first synchronization signal are stably synchronized when Genlock is enabled. In the following, two synchronization signals being stably synchronized is expressed as "Genlock is stable". For example, a difference between an WV synchronization signal (the first synchronization signal) generated by the Genlock control unit 110 and an HIV synchronization signal (the second synchronization signal) inputted from the synchronization signal input unit 109 is obtained. Then, when the difference continues to be within ±a predetermined number of clock cycles for a predetermined period or more, it is determined that Genlock is stable. Otherwise, it is determined that that Genlock is not stable.

Further, when the Genlock control unit 110 enables Genlock and starts synchronization, several seconds or so are necessary for the first synchronization signal to become stably synchronized with the second synchronization signal inputted from the synchronization signal input unit 109. Consequently, synchronization is unstable for a predetermined time (e.g., 7 seconds) or so from when Genlock is started. Therefore, as an alternative determination method, it may be determined whether synchronization is stable based on whether the predetermined time (e.g., 7 seconds) has elapsed from when the Genlock control unit 110 enabled Genlock and started synchronization. While Genlock is stabilizing, a video disturbance may occur or processing for stopping video processing may be introduced for synchronization processing.

The communication unit 112 performs processing for network communication via a LAN. For example, the communication unit 112 transmits video data outputted from the system control unit 103 to the controller 120, Further, the communication unit 112 receives a control command from the controller 120 and passes it to the system control unit 103.

The controller 120 operates as a switcher (a switching apparatus or a display control apparatus) for switching videos to be displayed on the display 130. The controller 120 includes an input unit 121, a system control unit 122, and a communication unit 123.

The input unit 121 is configured by a button, a joystick, and the like and accepts various operations from the user. The operations include, for example, an operation for switching the cameras 100 performing video output, an operation for switching the operation modes of the camera 100, and an operation for enabling/disabling Genlock. The system control unit 122 transmits a control command to the camera 100 via the communication unit 123 in response to an operation received from the user.

The communication unit 123 performs processing for network communication via the LAN. For example, the communication unit 123 receives video data outputted from the camera 100 and forwards it to the display 130. Further, the communication unit 123 receives a control command from the system control unit 122 and transmits it to the camera 100.

The display 130 includes the display unit 131. More specifically, the display 130 receives video data outputted from the camera 100 via the controller 120 and displays it on the display unit 131. The display unit 131 is a display device, such as a liquid crystal display, for example.

The synchronization signal output apparatus 140 includes a synchronization signal output unit 141. The synchronization signal output unit 141 outputs a synchronization signal (corresponding to the aforementioned second synchronization signal) serving as a reference signal for causing a plurality of the cameras 100 to operate in synchronization. In the first embodiment, it is assumed that a synchronization signal from the synchronization signal output apparatus 140 is inputted to the synchronization signal input unit 109 of each of the two cameras 100.

Figure 2B:
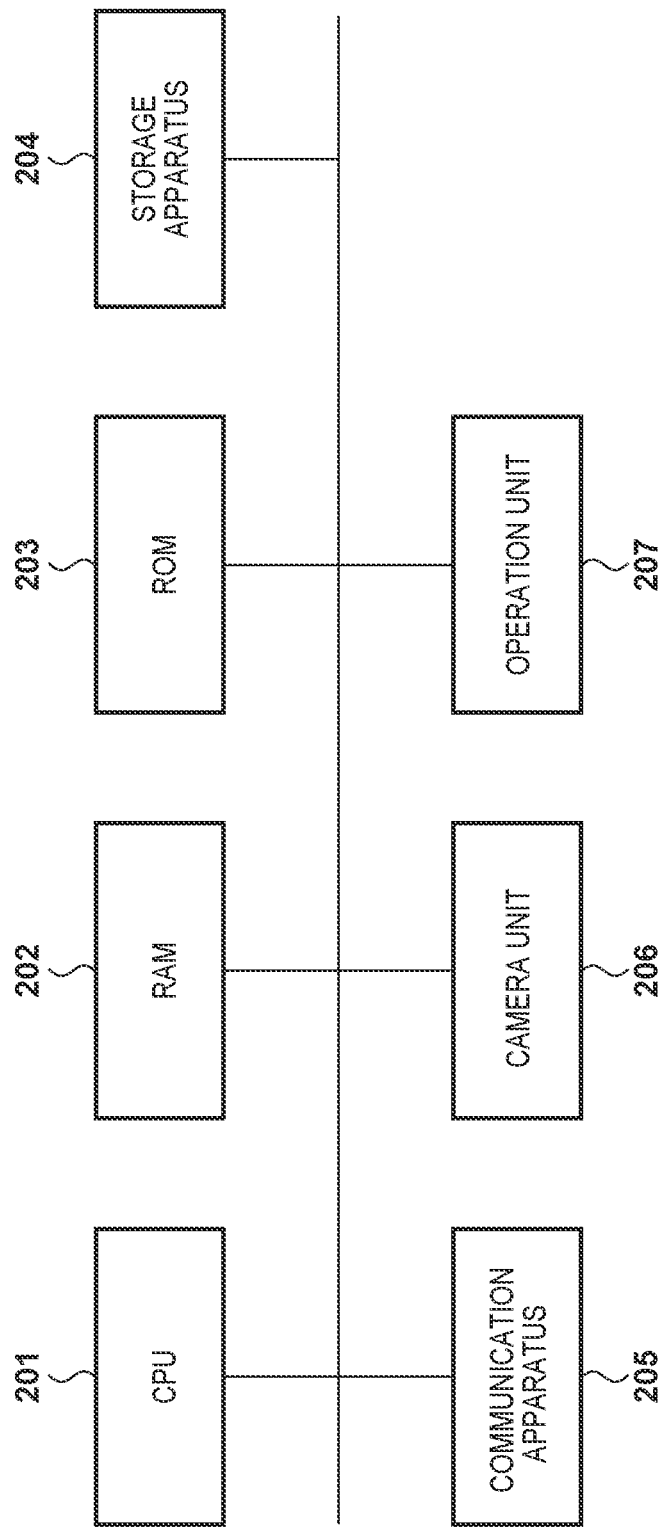
FIG. 2B is a diagram illustrating a hardware configuration of a camera.

FIG. 2B is a diagram illustrating a hardware configuration of the camera. A CPU 201 is an apparatus that performs overall control of the camera 100 and calculates, processes, and manages data. For example, the CPU 201 can function as the system control unit 103, the speed control unit 107, the mode control unit 108, the Genlock control unit 110, and the like by executing various programs. The CPU 201 may also function as the image processing unit 102 that generates image data by compressing and encoding a digital image signal outputted from a camera unit 206. These functional units may be realized by a dedicated processor (such as an ASIC).

A RAM 202 is a volatile memory and is used as a temporary storage region, such as a main memory and a work area of the CPU 201. A ROM 203 is a non-volatile memory, and various programs to be executed by the CPU 201, various parameters, and the like are each stored in a predetermined region. For example, the CPU 201 controls respective units of the camera 100 by executing various programs stored in the ROM 203 using the RAM 202 as a work memory. A program for the CPU 201 to operate is not limited to being stored in the ROM 203 and may be stored in a storage apparatus 204.

The storage apparatus 204 is configured by, for example, an SD card, an HDD, a flash memory, or the like, and can function as the storage unit 104. The storage apparatus 204 stores application programs, an OS, control programs, image data, other data, and the like. The storage apparatus 204 can read and write data based on control of the CPU 201. The storage apparatus 204 may be used in place of the RAM 202 and the ROM 203.

A communication apparatus 205 is a communication interface for communicating with the controller 120 based on control of the CPU 201 and can function as the communication unit 112. The communication apparatus 205 can include a wireless communication module for wireless connection communication. In that case, the communication apparatus 205 may include a well-known circuit mechanism including an antenna system, an RF transmitter/receiver, one or more amplifiers, a tuner, one or more oscillators, a digital signal processor, a CODEC chipset, a subscriber identification module card, a memory, and the like. The communication apparatus 205 can include a wired communication module for wired connection communication. The wired communication module enables wired connection communication with another device via one or more physical ports. The physical ports can use Ethernet, USB, IEEE 1394, and the like. The communication apparatus 205 can also include various software components that process data and can be configured as an alternative to the aforementioned respective units.

The camera unit 206 can function as the image capturing unit 101, the pan driving unit 105, and the tilt driving unit 106 and generates a subject image by capturing a monitoring region, which is real space. The camera unit 206 converts an analog image signal obtained using an image capturing element into a digital image signal by A/D conversion and outputs a result to the CPU 201. In addition to a still mage, the camera unit 206 can obtain, for example, a moving image (a live video) of 30 fps of a monitoring region by obtaining a predetermined number of image frames per second (e.g., 30 frames). An operation unit 207 is configured by, for example, a button, arrow keys, and a touch panel, and receives operation input from the user.

Although FIG. 2B is described as the hardware configuration of the camera 100, a hardware configuration of the controller 120 may also conform to FIG. 2B. In that case, the camera unit 206 is excluded from the configuration. The operation unit 207 functions as the input unit 121 and may further include a keyboard and a mouse.

<Apparatus Operation>

Figure 3:
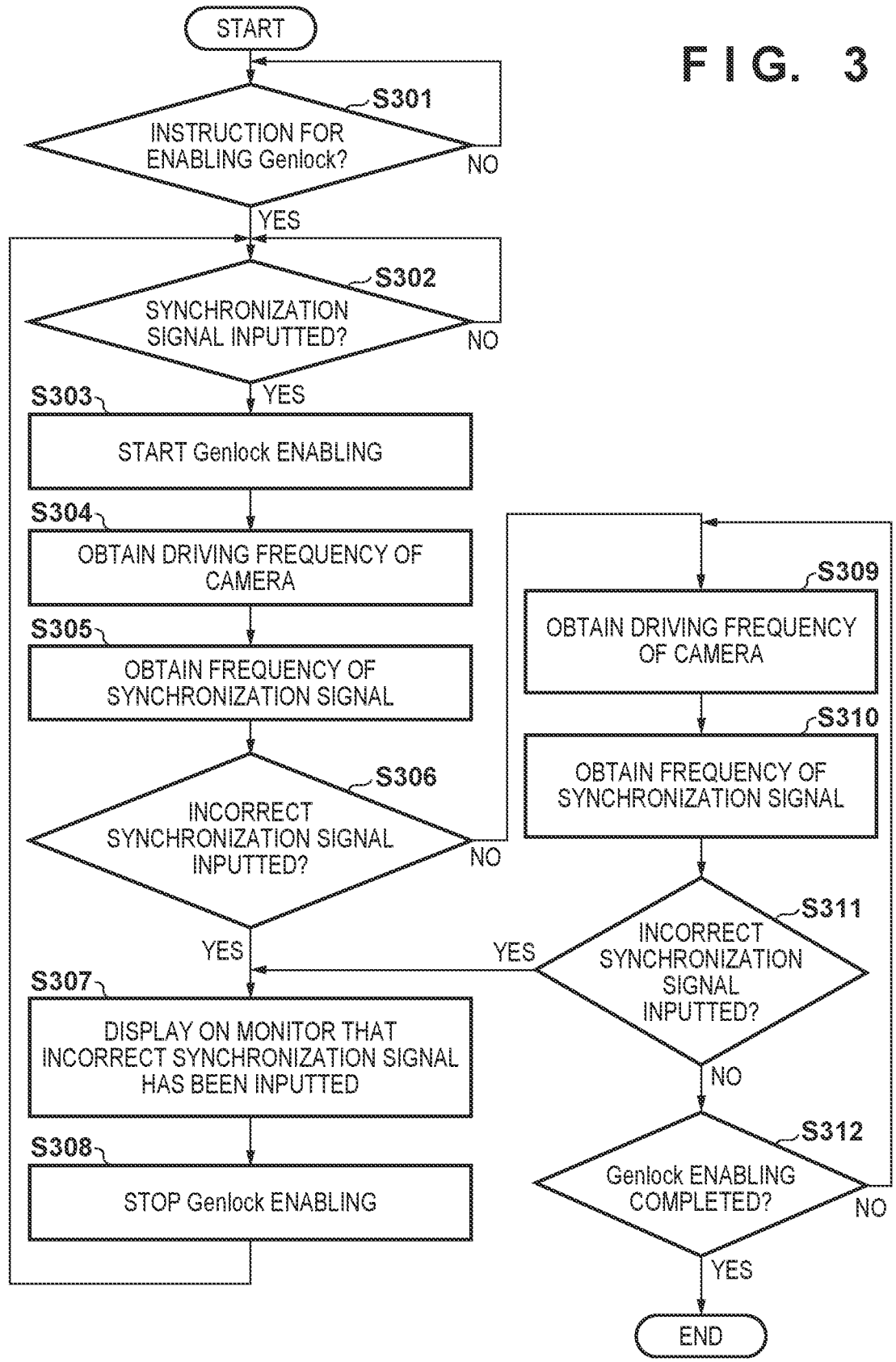
FIG. 3 is a flowchart for explaining an operation of the camera in a first embodiment.

FIG. 3 is a flowchart for explaining an operation of the camera 100 in the first embodiment. Processing corresponding to the flowchart of FIG. 3 is realized by the CPU 201 executing a predetermined program. Here, it is assumed that the camera 100, the controller 120, the display 130, and the synchronization signal output apparatus 140 have already been activated and that the controller 120 is in a state in which it is capable of receiving an input operation of the user. The flowchart may be configured to be started in response to an instruction from the user or started automatically by the camera 100. Furthermore, it is assumed that before executing the processing of this flowchart, the system control unit 103 has started an operation in the normal image capturing mode by controlling respective blocks of the camera 100.

In step S301, the Genlock control unit 110 determines whether or not an instruction for enabling Genlock has been received from the controller 120. If it is determined that an instruction for enabling Genlock has been received, the processing proceeds to step S302. If it is not determined that an instruction for enabling Genlock has been received, step S301 continues.

In step S302, the synchronization signal input unit 109 determines whether a synchronization signal (the second synchronization signal) has been inputted from the synchronization signal output apparatus 140. If it is determined that the synchronization signal has been inputted, the processing proceeds to step S303. Meanwhile, if it is determined that the synchronization signal has not been inputted, processing for step S302 continues.

In step S303, the Genlock control unit 110 starts Genlock enabling. In step S304, the system control unit 103 obtains a drive frequency at which the camera 100 operates. In step S305, the Genlock control unit 110 obtains a frequency of the synchronization signal inputted from the synchronization signal input unit 109.

In step S306, the system control unit 103 determines whether an incorrect synchronization signal has been inputted from the synchronization signal input unit 109. For example, the system control unit 103 determines whether the frequency of the synchronization signal inputted from the synchronization signal input unit 109 and the drive frequency at which the camera 100 operates coincide. If they coincide, it is determined that a correct synchronization signal has been inputted; if they do not coincide, it is determined that an incorrect synchronization signal has been inputted.

For example, if a driving frequency at which the camera 100 operates is 59.94 Hz and a frequency of the synchronization signal inputted from the synchronization signal input unit 109 is 50.00 Hz, it is determined that an incorrect synchronization signal has been inputted because the frequencies do not coincide. Further, for example, if a frequency of the synchronization signal inputted from the synchronization signal input unit 109 and a drive frequency at which the camera 100 operates satisfy a predetermined relationship (such as when one is an integer multiple of the other), it is determined that a correct synchronization signal has been inputted. Meanwhile, it is also possible to conceive a method in which if the frequencies do not satisfy a predetermined relationship, it is determined that an incorrect synchronization signal has been inputted. For example, if a driving frequency at which the camera 100 operates is 59.94 Hz and a frequency of the synchronization signal inputted from the synchronization signal input unit 109 is 29.97 Hz, since their relationship is that in which one is a multiple of another, it is determined that a correct synchronization signal has been inputted. If it is determined that an incorrect synchronization signal has been inputted, the processing proceeds to step S307. If it is determined that an incorrect synchronization signal has not been inputted, the processing proceeds to step S309.

In step S307, the system control unit 103 outputs "image data indicating that an incorrect synchronization signal has been inputted" stored in the storage unit 104 to the controller 120 via the communication unit 112. At that time, the system control unit 103 outputs "image data indicating a frequency of a correct synchronization signal" to the controller 120. Then, the controller 120 performs a warning indication of information via the display unit 131 of the display 130 based on these image data.

Figure 4:
FIG. 4 is a diagram illustrating an example of a display for when an incorrect synchronization signal is inputted.

FIG. 4 is a diagram illustrating an example of a display for when an incorrect synchronization signal is inputted. Here, a warning indication to the effect that an incorrect synchronization signal has been inputted and a frequency indication pertaining to a frequency of a correct synchronization signal (to be inputted) (e.g., 59.94 Hz) are displayed. The frequency of the correct synchronization signal is a frequency that can be used as the second synchronization signal.

In step S308, the Genlock control unit 110 stops Genlock enabling. Since step S309 is the same processing as that for step S304, a description thereof will be omitted. Since step S310 is the same processing as that for step S305, a description thereof will be omitted. Since step S311 is the same processing as that for step S306, a description thereof will be omitted. In step S311, if it is determined that an incorrect synchronization signal has been inputted, the processing proceeds to step S307. If it is determined that an incorrect synchronization signal has not been inputted, the processing proceeds to step S312.

In step S312, the Genlock control unit 110 determines whether Genlock enabling has been completed. If Genlock enabling has been completed, the processing in this flowchart is terminated. If it is determined that Genlock enabling has not been completed, the processing proceeds to step S309.

As described above, by virtue of the first embodiment, when an incorrect synchronization signal is inputted to a camera, which is an image capturing apparatus, it is possible to notify the user that an incorrect synchronization signal has been inputted. Furthermore, the user can recognize information of a correct synchronization signal for Genlock. In addition, by stopping Genlock when an incorrect synchronization signal is inputted, it becomes possible to prevent an operation of the camera 100 from becoming unstable.

Further, even when an incorrect synchronization signal is inputted during Genlock enabling, the user is notified that an incorrect synchronization signal has been inputted and can recognize that. Further, by stopping (aborting) Genlock enabling (i.e., transitioning to synchronization control based on the first synchronization signal), an operation of the camera 100 can be prevented from becoming unstable.
(Variation)

As a variation, a description will be given for a mode in which an order of processing in the first embodiment has been changed. Since the system configuration and the apparatus configuration are the same as those of the first embodiment (FIGS. 1 and 2A), a description thereof will be omitted.
<Apparatus Operation>

Figure 5:
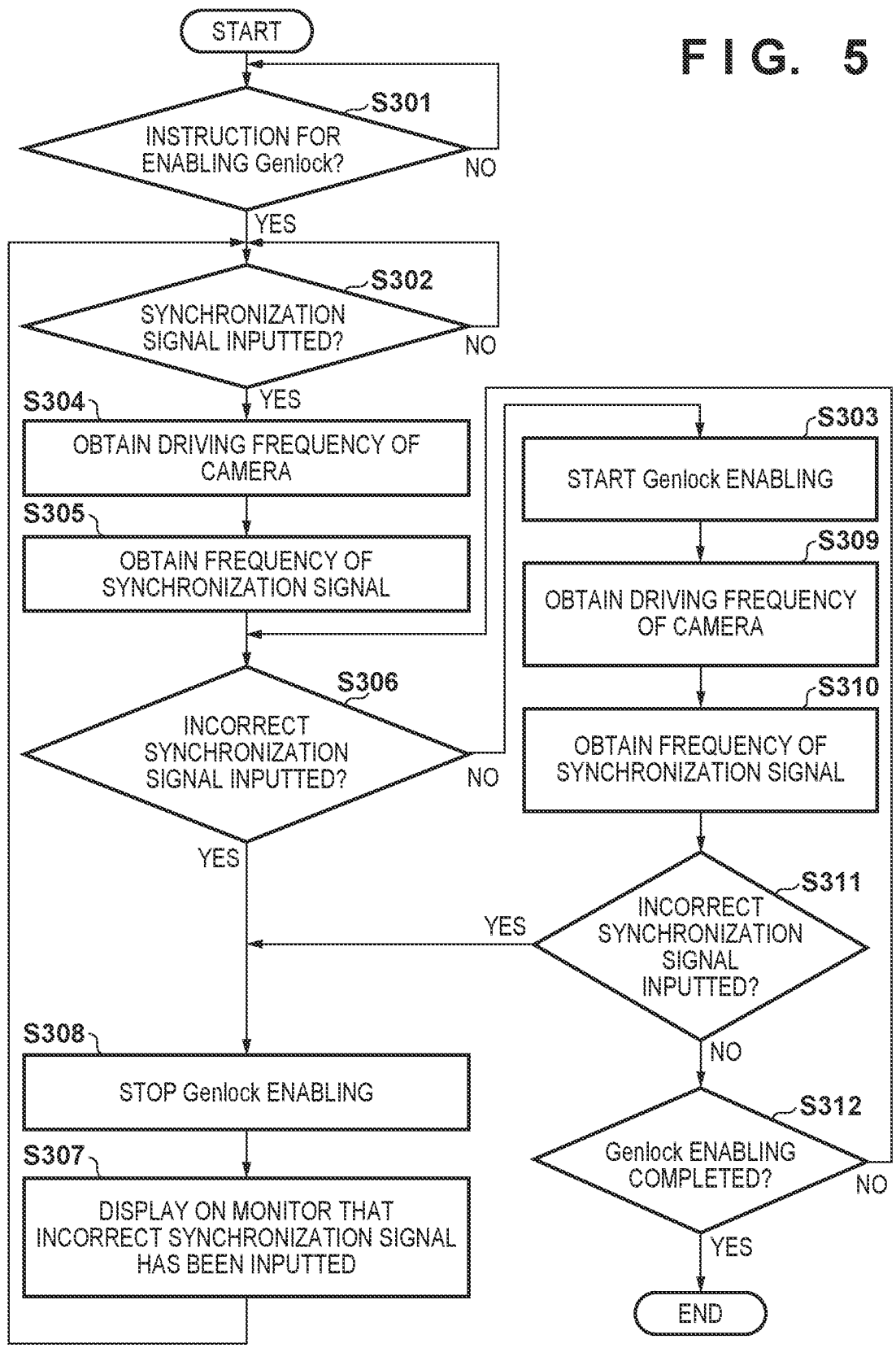
FIG. 5 is a flowchart for explaining an operation of the camera in a variation.

FIG. 5 is a flowchart for explaining an operation of the camera 100 in a variation. Processing corresponding to the flowchart of FIG. 5 is realized by the CPU 201 executing a predetermined program. Since processing for steps S301 to S312 is the same as the processing for steps S301 to S312 of the first embodiment (FIG. 3), a description thereof will be omitted.

However, in the present variation, the processing for starting Genlock enabling step S303) is performed after confirming that an incorrect synchronization signal has not been inputted (No in step S306). That is, Genlock enabling is started after a correct synchronization signal has been inputted.

This prevents Genlock enabling due to input of an incorrect synchronization signal, which makes it possible to prevent a system of the camera 100 from becoming unstable. Furthermore, when an incorrect synchronization signal is inputted, it is possible to notify the user that an incorrect synchronization signal has been inputted. Furthermore, at that time, the user can recognize information of a correct synchronization signal.

Further, even when an incorrect synchronization signal is inputted during Genlock enabling, the user is notified that an incorrect synchronization signal has been inputted and can recognize that. Further, by stopping (aborting) Genlock enabling, an operation of the camera 100 can be prevented from becoming unstable.

Second Embodiment

In a second embodiment, an operation of another mode will be described. Since the system configuration and the apparatus configuration are the same as those of the first embodiment for (FIGS. 1 and 2A), a description thereof will be omitted.
<Apparatus Operation>

Figure 6:
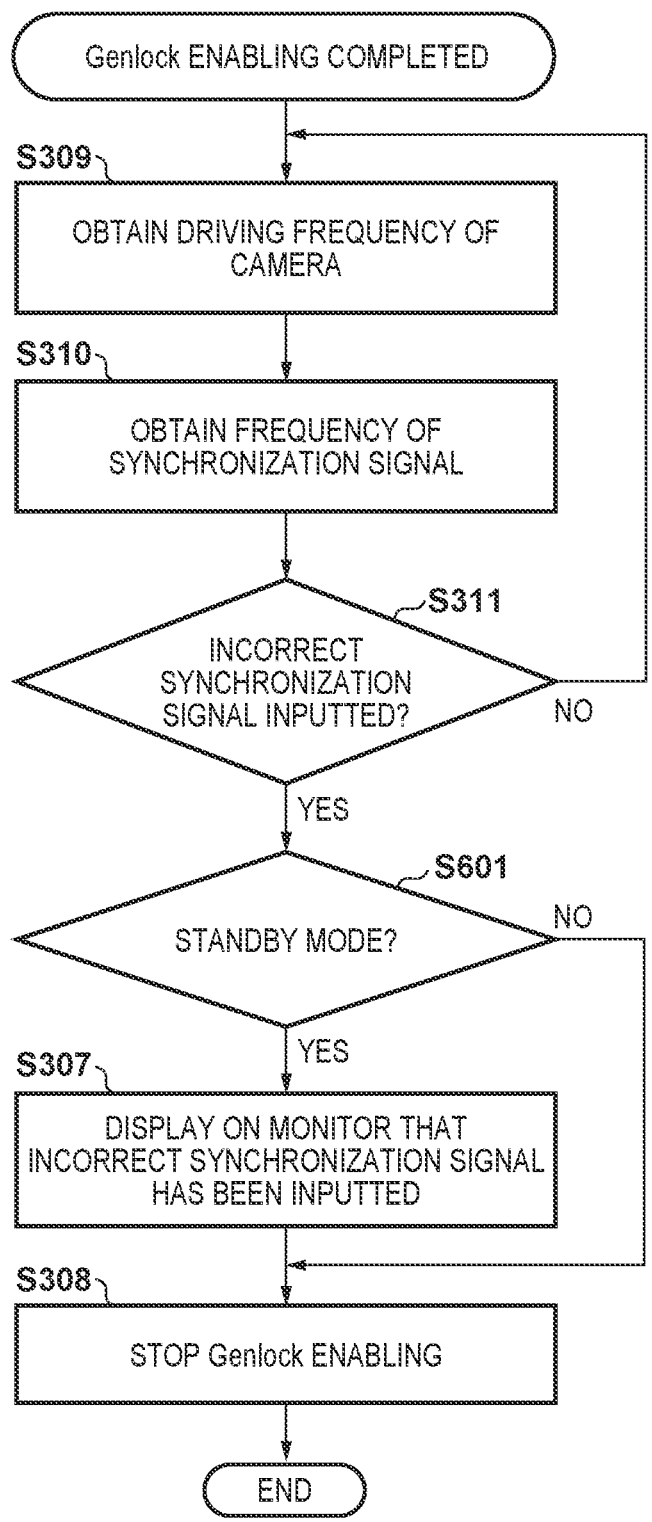
FIG. 6 is a flowchart for explaining an operation of the camera in a second embodiment.

FIG. 6 is a flowchart for explaining an operation of the camera 100 in the second embodiment. Processing corresponding to the flowchart of FIG. 6 is executed after step S312 (completion of Genlock enabling) of the flowchart of the first embodiment (FIG. 3) or a variation (FIG. 5). Processing corresponding to the flowchart of FIG. 6 is realized by the CPU 201 executing a predetermined program. Since processing for steps S301 to S312 indicated in FIG. 6 is the same as the processing for steps S301 to S312 of the first embodiment (FIG. 3), a description thereof will be omitted.

In step S601, the system control unit 103 determines whether the camera 100 is in the standby mode. If it is determined that the camera 100 is in the standby mode, the processing proceeds to step S307. Meanwhile, if it determined that the camera 100 is not in the standby mode (i.e., the normal image capturing mode or the playback mode), the processing proceeds to step S308.

That is, when an incorrect synchronization signal is inputted after Genlock enabling has been completed, depending on an operation mode at that time, it is determined whether to notify the user that an incorrect synchronization signal has been inputted. Here, if the operation mode is the standby mode, it is displayed on the display that an incorrect synchronization signal has been inputted. In addition, by stopping Genlock enabling when an incorrect synchronization signal is inputted, it becomes possible to prevent a system of the camera 100 from becoming unstable.

Meanwhile, if an incorrect synchronization signal is inputted after Genlock enabling has been completed, in a case of a state other than the standby mode, displaying on the display that an incorrect synchronization signal has been inputted is prevented. That is, in the normal image capturing mode or the playback mode, priority is given to displaying a video on the display so as not to interfere with viewing of the video by the user. However, even in the normal image capturing mode or playback mode, if an incorrect synchronization signal is inputted, Genlock enabling is stopped. Accordingly, an operation of the camera 100 can be prevented from becoming unstable.

As described above, by virtue of the second embodiment, when an incorrect synchronization signal is inputted to a camera, which is an image capturing apparatus, it is displayed on the display that an incorrect synchronization signal has been inputted only when the camera is in the standby mode. Thus, viewing of a video by the user is not interfered with, which makes operation in consideration of convenience of the user possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and, equivalent structures and functions.

This application claims the benefit of Japanese Patent Application No, 2021-159723, filed Sep. 29, 2021 which is hereby incorporated by reference herein in its entirety.

What is claimed is:

1. An image capturing apparatus comprising a processor executing instructions which, when executed by the processor, cause the image capturing apparatus to:

enable, upon receiving an instruction for enabling a Genlock function, the Genlock function;

obtain a driving frequency in which the image capturing apparatus is capable of operating;

obtain a frequency of a synchronization signal inputted from an external device, the synchronization signal being used for outputting a video obtained by the image capturing apparatus;

determine whether the driving frequency and the frequency of the inputted synchronization signal satisfy a predetermined relationship;

disable, in a case where it is determined that the predetermined relationship is not satisfied, the Genlock function, and output information indicating that the inputted synchronization signal is incorrect and information indicating a frequency of a correct synchronization signal to be input; and re-enable, in a case where it is determined that the predetermined relationship is satisfied after disabling the Genlock function, the Genlock function.

2. The image capturing apparatus according to claim 1, wherein the frequency of the correct synchronization signal is a frequency that satisfies the predetermined relationship with the driving frequency.

3. The image capturing apparatus according to claim 1, wherein the predetermined relationship is a relationship in which one of the driving frequency and the frequency of the inputted synchronization signal corresponds to an integer multiple of the other.

4. The image capturing apparatus according to claim 1, wherein in a case where while performing synchronization control in which the video is to be outputted based on the inputted synchronization signal, and it is determined that the predetermined relationship is not satisfied, the synchronization control is stopped.

5. The image capturing apparatus according to claim 1, wherein the instructions cause the image capturing apparatus to, in a case where it is determined that the driving frequency and the frequency of the inputted synchronization signal satisfy the predetermined relationship, perform synchronization control in which the video is to be outputted based on the inputted synchronization signal.

6. A method of controlling an image capturing apparatus, the method comprising:

enabling, upon receiving an instruction for enabling a Genlock function, the Genlock function;

obtaining a driving frequency in which the image capturing apparatus is capable of operating;

obtaining a frequency of a synchronization signal inputted from an external device, the synchronization signal being used for outputting a video obtained by the image capturing apparatus;

determining whether the driving frequency and the frequency of the inputted synchronization signal satisfy a predetermined relationship;

in a case where it is determined that the predetermined relationship is not satisfied, disabling the Genlock function, and outputting information indicating that the inputted synchronization signal is incorrect and information indicating a frequency of a correct synchronization signal to be input; and re-enabling, in a case where it is determined that the predetermined relationship is satisfied after disabling the Genlock function, the Genlock function.

7. The method according to claim 6, wherein
the frequency of the correct synchronization signal is a frequency that satisfies the predetermined relationship with the driving frequency.

8. The method according to claim 6, wherein
the predetermined relationship is a relationship in which one of the driving frequency and the frequency of the inputted synchronization signal corresponds to an integer multiple of the other.

9. The method according to claim 6, wherein
in a case where while performing synchronization control in which the video is to be outputted based on the inputted synchronization signal, and it is determined that the predetermined relationship is not satisfied, the synchronization control is stopped.

10. The method according to claim 6, further comprising performing, in a case where it is determined that the driving frequency and the frequency of the inputted synchronization signal satisfy the predetermined relationship, synchronization control in which the video is to be outputted based on the inputted synchronization signal.

11. A non-transitory computer-readable recording medium storing a program for causing a computer to execute a method of controlling an image capturing apparatus, the method comprising:
 enabling, upon receiving an instruction for enabling a Genlock function, the Genlock function;
 obtaining a driving frequency in which the image capturing apparatus is capable of operating;
 obtaining a frequency of a synchronization signal inputted from an external device, the synchronization signal being used for outputting a video obtained by the image capturing apparatus;
 determining whether the driving frequency and the frequency of the inputted synchronization signal satisfy a predetermined relationship;
  in a case where it is determined that the predetermined relationship is not satisfied, disabling the Genlock function, and outputting information indicating that the inputted synchronization signal is incorrect and information indicating a frequency of a correct synchronization signal to be input; and
 re-enabling, in a case where it is determined that the predetermined relationship is satisfied after disabling the Genlock function, the Genlock function.

12. An image capturing apparatus comprising a processor executing instructions which, when executed by the processor, cause the image capturing apparatus to:
 receive an instruction for enabling a Genlock function;
 obtain a driving frequency in which the image capturing apparatus is capable of operating;
 obtain a frequency of a synchronization signal inputted from an external device, the synchronization signal being used for outputting a video obtained by the image capturing apparatus;
 determine whether the driving frequency and the frequency of the inputted synchronization signal satisfy a predetermined relationship;
 enable, in a case where it is determined that the predetermined relationship is satisfied, the Genlock function; and
 output, in a case where it is determined that the predetermined relationship is not satisfied, information indicating that the inputted synchronization signal is incorrect and information indicating a frequency of a correct synchronization signal to be input, and enable, in a case where it is determined that the predetermined relationship is satisfied after a predetermined time has elapsed after it is determined that the predetermined relationship is not satisfied, the Genlock function.

13. A method of controlling an image capturing apparatus, the method comprising:
 receiving an instruction for enabling a Genlock function;
 obtaining a driving frequency in which the image capturing apparatus is capable of operating;
 obtaining a frequency of a synchronization signal inputted from an external device, the synchronization signal being used for outputting a video obtained by the image capturing apparatus;
 determining whether the driving frequency and the frequency of the inputted synchronization signal satisfy a predetermined relationship;
 enabling, in a case where it is determined that the predetermined relationship is satisfied, the Genlock function; and
 outputting, in a case where it is determined that the predetermined relationship is not satisfied, information indicating that the inputted synchronization signal is incorrect and information indicating a frequency of a correct synchronization signal to be input, and enable, in a case where it is determined that the predetermined relationship is satisfied after a predetermined time has elapsed after it is determined that the predetermined relationship is not satisfied, the Genlock function.

14. A non-transitory computer-readable recording medium storing a program for causing a computer to execute a method of controlling an image capturing apparatus, the method comprising:
 receiving an instruction for enabling a Genlock function;
 obtaining a driving frequency in which the image capturing apparatus is capable of operating;
 obtaining a frequency of a synchronization signal inputted from an external device, the synchronization signal being used for outputting a video obtained by the image capturing apparatus;
 determining whether the driving frequency and the frequency of the inputted synchronization signal satisfy a predetermined relationship;
 enabling, in a case where it is determined that the predetermined relationship is satisfied, the Genlock function; and
 outputting, in a case where it is determined that the predetermined relationship is not satisfied, information indicating that the inputted synchronization signal is incorrect and information indicating a frequency of a correct synchronization signal to be input, and enable, in a case where it is determined that the predetermined relationship is satisfied after a predetermined time has elapsed after it is determined that the predetermined relationship is not satisfied, the Genlock function.

\* \* \* \* \*